Patented Oct. 15, 1946

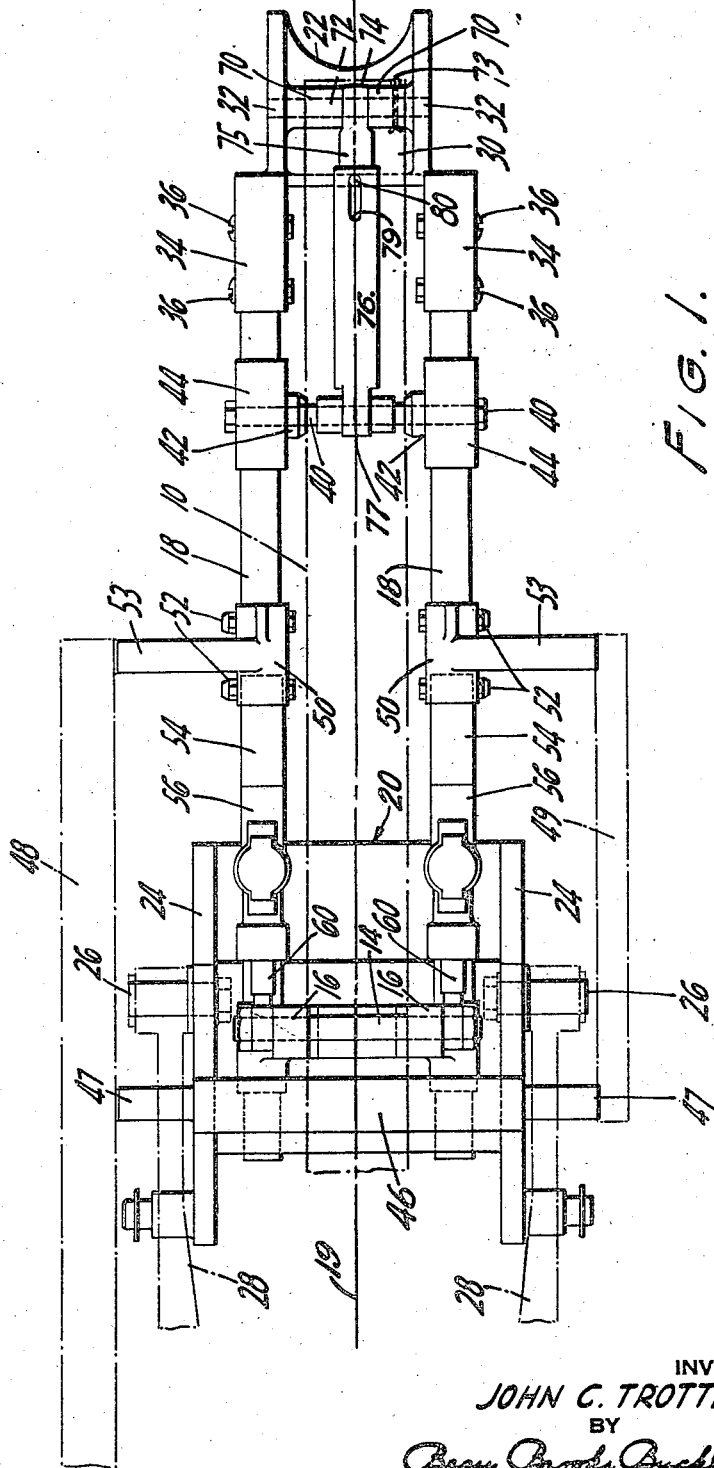

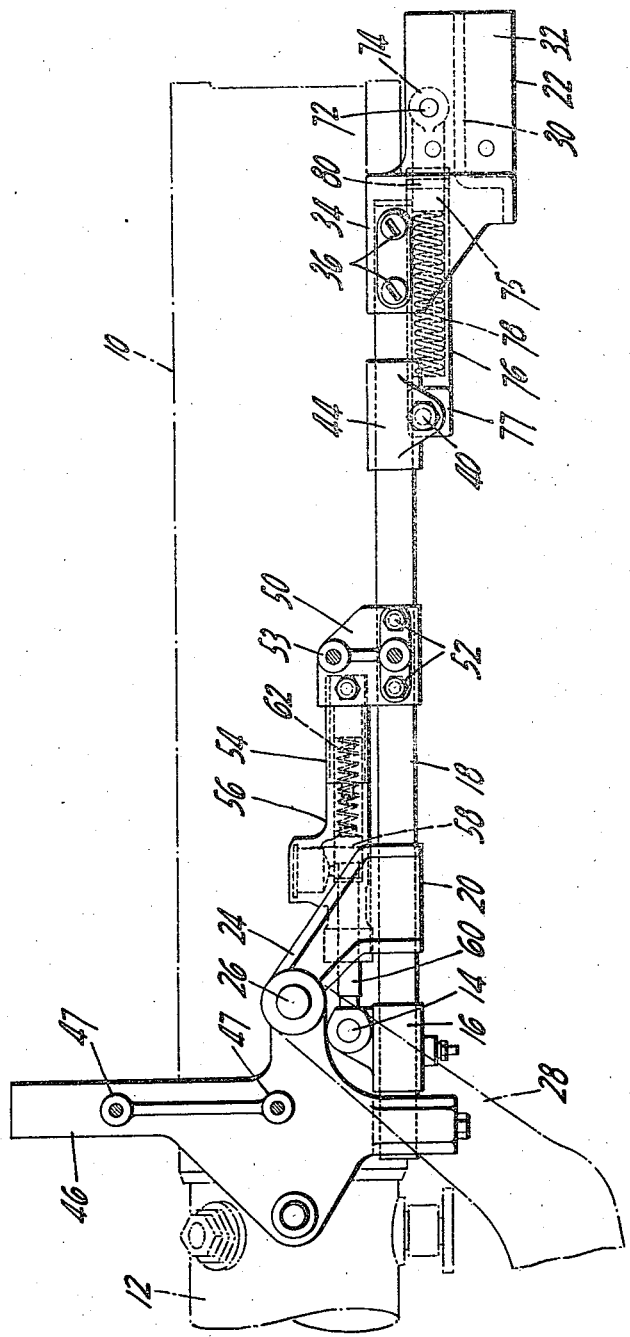

2,409,404

UNITED STATES PATENT OFFICE 2,409,404

SHOCK ABSORBING GUN MOUNT

John C. Trotter, Williamsville, N. Y., assignor to Bell Aircraft Corporation, Buffalo, N. Y.

Application February 9, 1942, Serial No. 429,986

6 Claims. (Cl. 89—42)

This invention relates to ordnance, and more particularly to recoil shock absorbing gun mount mechanisms for rapid fire guns such as machine guns or the like. It is an object of the present invention to provide an improved gun mount device of the character described which is adapted to be applicable to a variety of machine gun types and to be adjustable to provide optimum recoil force absorbing and counter-recoil operations under a variety of gun elevational adjustment conditions. Another object of the present invention is to provide a gun mount device including an improved combination spring and hydraulic recoil shock and counter recoil control means. Another object of the invention is to provide a gun mount device of the character described embodying design and structural improvements whereby the device may be most economically manufactured in large quantities through means of relatively simple shop processes. Another object of the invention is to provide an improved gun mount device of the character described wherein the functional unit portions thereof are so provided as to be self-contained and readily accessible for inspection, adjustment, repair, or replacement without substantial disruption of the entire gun mount assembly. Other objects and advantages of the invention will appear from the specification hereinafter.

In the drawings:

Fig. 1 is a top plan of a machine gun mount of the invention, showing a machine gun indicated by means of broken lines as being mounted thereon; and Fig. 2 is a side elevation thereof.

The drawings illustrate the invention as being embodied in a gun mount device supporting a machine gun having a main casing portion indicated generally at 10, and having a gun barrel and cooling jacket portion indicated at 12. A transverse bolt 14 is carried by the gun so as to extend at opposite sides thereof to engage a pair of gun slide brackets 16 which have perforated lower end portions slidably embracing corresponding mounting rails 18—18. The rails 18—18 are arranged to extend parallel to the longitudinal axis on each side of the plan view center line 19 of the gun and at opposite sides thereof adjacent the lower level of the gun casing. The rails 18—18 are interconnected adjacent their forward ends by means of a transverse bracket 20, and adjacent their rear ends by means of another transverse bracket 22. The bracket 20 is permanently attached to the rails 18—18, as by means of welding or the like, and is formed at its opposite sides with a pair of opposed upstanding leg portions 24—24 carrying pins 26—26 for mounting the rail-bracket structure upon suitably apertured upper end portions of a yoke member 28. Hence, the rail-bracket assembly is mounted to be freely pivotable relative to the yoke 28 about a horizontal axis coincident with the axes of the pins 26—26 for elevational adjustments of the gun battery. It will be understood that the yoke 28 may be mounted upon a suitable base member (not shown) so as to be pivotable relative thereto about a vertical axis, for azimuth adjustments of the gun battery.

The bracket 22 comprises a back plate portion 30 interconnecting opposite side plate portions 32—32 which extend forwardly and terminate in corresponding socket portions 34—34 telescopically embracing the rear end portions of the corresponding rails 18—18. Threaded fasteners 36 transverse the bracket and rail members for detachably fixing the bracket 22 to the rail assembly. A second transverse bolt 40 is carried by the gun casing 10 adjacent the rear end portion thereof by means of lugs 42 extending below the gun casing; and the bolt 40 is so arranged as to extend at its opposite end portions through suitably apertured gun brackets 44—44 which slidably embrace the corresponding rails 18—18. Thus, it will be understood that the gun 10 is mounted upon the gun mount frame comprising the rail-bracket assembly by means of transverse bolts 14—40 adjacent the front and rear end portions of the gun, respectively; and that the bolts 14—40 engage slide bracket devices 16—14 which are slidably mounted upon the rail members; and that the entire gun mount frame assembly is mounted as an integral structure for gun elevational and azimuth adjustments upon the forked pedestal 28 at approximately the location of the center of gravity of the gun and gun mount structure, by means of the pins 26—26.

The bracket 20 is formed with an enlarged eye portion 46 extending forwardly from the leg portions 24—24 of the bracket and across from one of said leg portions to the other over the top of and in spaced relation with the gun to encompass the gun casing and to provide a rigid bracket structure having extensions 47 for supporting the usual gun accessory ammunition magazine as indicated at 48; and the usual gun sight mechanism as indicated at 49. A pair of brackets 50—50 are mounted by means of bolt connectors 52 upon corresponding of the rails 18—18 so as to extend rigidly therefrom in upward and lateral directions. Lateral arm portions 53—53 extend therefrom to provide further mounting connection means for the magazine 48 and the gun sight device 49. The brackets 50—50 are socketed in their upper forward face portions so as to receive in slip-fitting relation therein the rear end portions of corresponding tubular members 54—54, so that the latter extend forwardly therefrom and parallel to the corresponding rail members 18—18. At their forward ends the tubes 54—54 receive reduced end portions of corresponding cylinder members 56—56 which are thereby also mounted to extend parallel to the corresponding rail members 18—18. The cylinder devices 56—56 each include an oil chamber portion accommodating a piston 58 slidably mounted therewithin and carrying a plunger 60 which extends from exteriorly thereof into the cylinder through the forward end thereof. At their front ends the plungers 60—60 pivotally connect to the transverse gun bolt 14 so as to move forwardly and rearwardly with respect to the gun mount frame coincidentally with recoil and counter recoil movements of the gun. A compression spring 62 is provided in each of the cylinders 56—56 for bearing between the rear end portion of the cylinder and the corresponding plunger 60 so as to provide the forces necessary for returning the gun to normal position subsequent to each recoil movement thereof during firing operations.

It will be understood that the plunger-cylinder devices will be provided with suitable oil reservoir and valve devices as is customary in the hydraulic shock dampener art, and that the mechanisms will be so arranged as to provide both recoil and counter recoil damping actions. It will be appreciated that the plunger-cylinder units are thus each self-contained devices which are adapted to function to assist in controlling the gun recoil and counter recoil operations in accord with modern ordnance practice. It will also be understood that due to the independent mounting of the gun bolt 14 upon the rails 18—18, the recoil and counter recoil control units are relieved of any bending loads such as would otherwise be imposed thereon if the plunger-cylinder units were arranged to carry the weight of the gun.

The bracket 22 includes a pair of inwardly extending bosses 70—70 which are bored in common alignment so as to be adapted to receive a pin 72 when slidably inserted therethrough. A cotter pin 73 is employed to fix the pin 72 in assembled relation upon the bracket. The boss portions 70—70 terminate short of abutting relation to provide space therebetween to accommodate the eye portion 74 of a plunger 75 so that the latter is thereby pivotally mounted upon the pin 72 to extend forwardly of the boss members and parallel to the longitudinal axis of the gun. A cylinder 76 is pivotally mounted at a forward end portion 77 thereof upon the transverse bolt 40 of the gun 10 so as to extend rearwardly therefrom into telescopic engagement over the plunger 75. A compression spring 78 is mounted within the cylinder 76 so as to bear against the plunger 75 to elastically resist recoil movements of the gun relative to the rail-bracket frame structure. The cylinder 76 is sloted longitudinally as at 79, and a pin 80 is arranged to be inserted within a suitably apertured portion of the plunger 75 so as to extend outwardly thereof into the slotted portion of the cylinder; and the slotted portion 79 of the cylinder is so dimensioned longitudinally as to limit the extent of relative movement between the cylinder and the plunger in response to action of the spring 78 so as to prevent unintended disassembly of the mechanism. Thus, it will be understood that this unit of the gun mount device is adapted to be readily assembled by simply threading the rear end portion of the cylinder 76 over the plunger 75 while the spring 78 is disposed therebetween, and then forcing the cylinder rearwardly until the slotted portion 79 thereof registers with the plunger opening for the pin 80, whereupon the pin 80 may be installed to fix the unit in assembled condition without interference with the recoil absorbing and counter recoil assist action thereof.

Thus, it will be understood that the gun mount frame of the invention comprises essentially a parallel rail unit disposed adjacent the bottom level of the gun casing; the rails being interconnected by means of a pair of transverse bracket devices adjacent forward and rearward ends thereof. The gun is mounted upon the rail unit by means of transverse bolt and slide bracket units adjacent the forward and rear end portions thereof; and the primary recoil shock absorbing and counter recoil movement providing actions are furnished by means of a pair of plunger-cylinder units which are fixed to the rail members and operatively connected to the gun by means of plunger members extending from one of the gun transverse bolts. An auxiliary recoil shock absorbing and return assist spring mechanism is housed within a cylinder-plunger unit disposed adjacent the rear end of the gun and between the rail members of the frame; the auxiliary cylinder-plunger unit being pivotally connected at one of its ends to another gun transverse bolt and at its other end to the rear rail bracket by means of slide-bolt connection devices extending through eye portions of the auxiliary cylinder-plunger unit.

The gun mount of the invention is thus so constructed and arranged that each of the functional units of the mechanism are self-contained and susceptible of economical manufacture by means of simple sub-assembly methods; and the entire mechanism is susceptible of final assembly through means of a relatively few and simple final assembly operations. Subsequent to final assembly, the entire mechanism is of unusually compact configuration; that is, it conforms closely to the shape of the gun to be mounted thereon and therefore adds little to the bulk of the gun and avoids any appreciable disturbance of the balance thereof. Subsequent to mounting of a gun thereon, the entire gun mount assembly is particularly adapted to be serviced in an improved manner, inasmuch as each of the functional units of the gun mount mechanism are so disposed and connected to the other units thereof so as to be readily inspected, adjusted, repaired or replaced without substantial disruption of the balance of the gun mount assembly.

Also, the gun mount of the invention provides a particular feature in that the auxiliary recoil shock absorbing and counter recoil cylinder-spring device 76—78 is disposed intermediately of the longitudinal axes of the rails 18—18 and of the longitudinal axes of the primary recoil and counter recoil control units 56—56. Consequently, recoil and counter recoil force loads are transmitted through the primary cylinder units 56—56 at opposite sides of the gun adjacent the forward end thereof and through the auxiliary spring unit at the rear end of the gun and centrally thereof, whereby the plan form stresses upon the gun mount frame are maintained to be always parallel to the axis of the gun. Consequently, development of forces such as would tend to twist or distort the gun mount frame are avoided, and the recoil and counter recoil reciprocative movements of the gun relative to the gun mount frame are at all times unhindered as by binding of the slide bracket parts relative to the rails 18—18 such as would otherwise occur.

It will be appreciated that the gun mount structure of the invention embodies a novel combination of recoil and counter recoil force control devices including a pair of primary control devices which may be of standard construction for use in connection with lighter weight machine guns; and that the auxiliary mechanism 78 of the spring is provided to augment the control action of the primary control devices so as to meet the recoil control requirements of a relatively heavy gun installation. Thus, it will be understood that the spring 78 will be selected so as to provide the necessary supplementary control action in any given case, and that the exchange of springs having different force characteristics for this purpose may be readily effected by simply removing the pins 70 and 80 and disassembling the plunger-cylinder device 75—76 and inserting a spring at 78 which will be predetermined to have the necessary force characteristics to provide the desired gun recoil operation when acting in combination with the primary shock control units 56—56. Also, it will be understood that in cases wherein it is predetermined that the gun battery will be employed consistently to fire at relatively high angles of elevation, a stiffer spring will be employed at 78 than if the battery is to fire at substantially horizontal attitudes.

Although only one form of the invention has been shown and described in detail, it will be apparent to those skilled in the art that the invention is not so limited but that various changes may be made therein without departing from the spirit of the invention or the scope of the appended claims.

I claim:

1. A mount device for a machine gun, said mount device including a pair of spaced rails disposed to lie at opposite sides of the plan view center line thereof and substantially parallel to the gun axis when mounted on said rails, said rails being interconnected at their corresponding opposite end portions by rigid bracket devices thereby forming a rail-bracket structure, slide bearing means slidably mounted upon said rails, connector devices extending for connection with the gun and engaging said bearing means whereby the mount is adapted to support the gun to be reciprocable relative to said rail-bracket structure, a hydraulically damped recoil shock absorbing and counter recoil control device mounted upon each of said rails and connecting said gun to said rail-bracket structure near one of the corresponding ends of said rails, and a recoil motion control and counter recoil force device mounted upon said bracket structure near the opposite corresponding ends of said rails and connecting said rails with said gun beneath the center line thereof.

2. In combination, a machine gun and a mount therefor, said mount including a pair of spaced rails disposed to lie alongside the gun and interconnected at their corresponding opposite end portions by rigid bracket devices thereby forming a rail-bracket structure, slide bearing means slidably mounted upon said rails, connector devices extending from the gun and engaging said bearing means whereby the gun is reciprocable relative to said rail-bracket structure, a hydraulically damped recoil shock absorbing and counter recoil control device mounted upon each of said rails near the forward end of said rail-bracket structure and connecting said structure with the gun at opposite sides of the center line of recoil forces thereof, and a recoil motion control and counter recoil force device mounted upon the opposite end of said rail-bracket structure for connecting said rails with said gun and located so as to be under the center line of recoil forces of said gun, said force device comprising a cylinder having a coiled compression spring enclosed therewithin and a plunger slidable relatively therewithin and bearing against said spring, and pivot connection means attaching opposite ends of said cylinder-plunger unit to said gun and said rail-bracket structure, respectively.

3. A gun mount including, substantially parallel spaced rails interconnected by transverse bracket devices thereby forming a rail-bracket structure, bearing means slidably mounted upon said rails and engaged with connector devices extending from the gun to be mounted thereon whereby the gun will be reciprocable relative to said rail-bracket structure, a pair of damped recoil shock absorbing devices mounted upon said rails near one end of said rail-bracket structure and arranged to be operatively associated with the mounted gun at opposite sides thereof to have their recoil reaction axes disposed in parallel relation, and a recoil motion control and counter recoil force device mounted upon the transverse bracket device connecting said rails at the opposite end of said rail-bracket structure and connecting said structure to the gun so as to have its recoil reaction axis extending in plan view intermediately of the reaction axes of said damped control devices and parallel thereto.

4. A machine gun mount including, a pair of spaced rails interconnected at their corresponding opposite end portions by rigid bracket devices thereby forming a rail-bracket structure, slide bearing means slidably mounted upon said rails and engaged by connector devices extending from the gun to be mounted thereon whereby the gun will be reciprocable relative to said rail-bracket structure, a pair of recoil shock absorbing and counter recoil control devices mounted upon said rails near one end of said rail-bracket structure and arranged to be operatively associated with the mounted gun at opposite sides thereof to have their recoil reaction axes disposed in parallel relation, and a recoil motion control and counter recoil force device operatively connected to the gun and mounted upon the bracket device connecting said rails adjacent the opposite end of said rail-bracket structure and having its axis at least in one view between the reaction axes of said first mentioned control devices.

5. A machine gun mount comprising a pair of substantially parallel spaced rails, means for supporting said rails in spaced positionally fixed relation, a front bracket fixed to each of said rails at a point substantially midway the ends of the rail and extending radially thereof, a front gun bracket paired with each of said front brackets, each of said front gun brackets being slidably disposed upon one of said rails and extending radially thereof, means for attaching said front gun brackets to said gun, a recoil shock absorbing device mounted between and connected to each pair of front fixed and front gun brackets, a rear fixed bracket having rail-engaging members carried by the ends of said rails and extending radially thereof, a rear gun bracket mounted upon each of said rails and paired with each of said rail-engaging members, each of said rear gun brackets being slidably mounted upon one of said rails and extending radially thereof, and means traversing the opposed rear gun brackets and attached to said gun, whereby the rear end of the gun is slidably supported upon said rails.

6. A machine gun mount comprising a pair of substantially parallel spaced rails, means for supporting said rails in spaced positionally fixed relation, a front bracket fixed to each of said rails at a point substantially midway the ends of the rail and extending radially thereof, a front gun bracket paired with each of said front brackets, each of said front gun brackets being slidably disposed upon one of said rails and extending radially thereof, means for attaching said front gun brackets to said gun, a recoil shock absorbing device mounted between and connected to each pair of front fixed and front gun brackets, a rear fixed bracket having rail-engaging members carried by the ends of said rails and extending radially thereof, a rear gun bracket mounted upon each of said rails and paired with each of said rail-engaging members, each of said rear gun brackets being slidably mounted upon one of said rails and extending radially thereof, means traversing the opposed rear gun brackets and attached to said gun, whereby the rear end of the gun is slidably supported upon said rails, and a counter recoil force device connecting said rear fixed bracket and said rear gun brackets for cooperating with said shock absorbing devices to procure counter recoil movements of said gun.

JOHN C. TROTTER.